United States Patent [19]

Nagaoka et al.

[11] 4,347,072
[45] Aug. 31, 1982

[54] METHOD AND DEVICE FOR REDUCING $NO_x$ GENERATED IN GLASS-MELTING FURNACE

[75] Inventors: Kinnosuke Nagaoka, Amagasaki; Tsumugu Kato; Mitsuru Nozawa, both of Nagoya, all of Japan

[73] Assignees: Ishizuka Glass Co., Ltd., Aichi; Agency of Industrial Science and Technology, Tokyo, both of Japan

[21] Appl. No.: 209,043

[22] Filed: Nov. 21, 1980

[51] Int. Cl.³ .............................................. C03B 5/16
[52] U.S. Cl. ........................................ 65/27; 65/135; 65/337; 65/347
[58] Field of Search .................... 65/337, 27, 135, 347

[56] References Cited

U.S. PATENT DOCUMENTS 2,354,324  7/1944  Longenecker ................... 65/347 X
3,592,623  7/1971  Shepherd ......................... 65/337 X

FOREIGN PATENT DOCUMENTS 53-8361  1/1978  Japan .

Primary Examiner—Arthur D. Kellogg
Attorney, Agent, or Firm—Stevens, Davis, Miller & Mosher

[57] ABSTRACT

Method and device for reducing $NO_x$ content in the waste gas generated in a glass melting furnace of side firing or end firing type equipped with a heat recovering device, comprising supplying hydrocarbons in a counter flow to that of the waste gas by combustion, or from the corners of the combustion chamber into the combustion chamber over the melt tank.

12 Claims, 5 Drawing Figures

METHOD AND DEVICE FOR REDUCING $NO_x$ GENERATED IN GLASS-MELTING FURNACE

BACKGROUND OF THE INVENTION

1. Field of the Invention

The present invention relates to an improved method for efficiently reducing $NO_x$ content in the waste gas which contains a large amount of impurities such as dust generated in a glass-melting furnace.

2. Prior Art of the Invention

Glass-melting furnace among the industrial furnaces generates waste gas containing a relatively high concentration of $NO_x$ since it is heated to about 1500° C. during operation. This waste gas is extremely dirty, containing a mixture of glass material, dust and substances evaporated from the surface of molten glass. In the case of boilers, measures for reducing $NO_x$ content have been developed such as use of low-$NO_x$ burners, a two-step combustion system as well as a catalytic method for reduction of $NO_x$ in waste gas with $NH_3$ or CO, so-called waste gas denitration method.

However, in glass-melting furnaces, such modification of combustion tends to lower the glass-melting temperature and to disturb the temperature distribution in the furnace required for obtaining a good quality of glass product, resulting in defects in the glass product such as bubbles or streaks. Meanwhile, the use of a catalyst for waste gas denitration is found impractical, because the catalyst is liable to be poisoned or clogged with dust in the exhaust gas. Thus all the methods are inapplicable to glass-melting furnaces.

For these reasons, a non-catalytic denitration method is deemed promising as a means for reducing $NO_x$ content in glass-melting furnaces. A non-catalytic method for reducing $NO_x$ content using $NH_3$ is known, but the effective temperature range in this method is 800°–1000° C. Therefore it would be virtually impossible to reduce $NO_x$ in a practical glass-melting furnace unless a special device is additionally installed.

In Japanese Patent Laid-open specification No. 8361/1978, another method is proposed in which hydrocarbons, oxygen-containing derivatives thereof, mixtures thereof, or organic mixtures of other materials (liquefied petroleum gas, kerosene, city gas and the like) with the hydrocarbons and/or oxygen-containing derivatives thereof (hereinafter referred to as hydrocarbons or the like) are added to hot waste gas and brought into contact with said gas. According to this method, hydrocarbon or the like is introduced into the furnace through the vicinity of a port, regenerator, heat exchange chamber or flue. However, three serious problems are encountered in application of this method to practical glass-melting furnaces.

One of them is as follows: Hydrocarbon or the like introduced into the furnace through the regenerator is burned with the residual oxygen in the waste gas. In a practical furnace the temperature in the vicinity of the regenerator exceeds at least 1000° C., but the concentration of the residual oxygen in the waste gas from the combustion chamber is normally less than about 3%, which is far lower than the oxygen concentration of the atmosphere in which ordinary combustion takes place. Thus the introduced hydrocarbon or the like burns very slowly, producing long flame, which comes into contact with the sidewall bricks and the checker bricks of the regenerator. A similar phenomenon will take place even when the introduction is made through the vicinity of the port, because of the short distance between the port and the regenerator.

The above phenomenon causes the following problem: The regenerator of glass-melting furnaces has a relatively short life as it is used under a severe condition. The refractory material is generally vulnerable to the reducing atmosphere, especially when it comes into contact with hot flame, because the transition elements contained therein (including not only those of the refractory constituents but also contained as impurities) change to lower valency state, thereby causing easy deformation with a decreased resistance to fire. In the conventional regenerator, chromia-magnesia bricks are mainly used as a material for checker bricks, so that the above-mentioned risk of embrittlement is all the more serious. To avoid such a risk, the flame caused by the supplied hydrocarbon or the like must be prevented from contacting the refractory wall of the regenerator.

The second problem is as follows: To attain an effective reduction of $NO_x$ content, the supplied hydrocarbon or the like must be brought into sufficient contact with the waste gas; however, since the regenerator has usually a large sectional area (i.e. large volume) and the supply amount of hydrocarbon or the like per one burner is considerably small compared with the amount of the main fuel consumed in the combustion chamber, the desired effect cannot be attained unless a large number of additional entrances are provided for introducing hydrocarbon or the like. Attaching such additional entrances in a furnace at work is almost impossible, excepting the case of installing a new furnace.

The third problem is as follows: A major part of the heat energy of the supplied hydrocarbon or the like is consumed in heating the checker bricks and partially in heating the secondary air so that utilization of the energy is not efficient.

SUMMARY OF THE INVENTION

The primary object of the present invention is to provide a method and a device for efficiently reducing $NO_x$ in hot, dirty waste gas generated in glass-melting furnaces.

Another object of the invention is to provide a method and a device for efficiently reducing $NO_x$ in the waste gas without largely modifying the conventional glass-melting furnace and without adding any special device thereto.

A further object of the invention is to provide a method and a device for efficiently treating the waste gas generated in glass-melting furnaces, wherein the heat generated by the treatment can be effectively utilized without any adverse effect on the refractory wall of the regenerator or on the resulting glass product itself.

The essential constituent of the present invention for achieving these objects is to supply the inside of the combustion chamber over the melting tank with hydrocarbon, oxygen-containing derivatives thereof or organic substances containing one or more of these hydrocarbons (hereafter referred to as hydrocarbon or the like) against the flow of waste gas in a side-firing or end-firing type glass-melting furnace equipped with a heat-recovering device.

These and other objects and many of the attendant advantages of this invention will be readily appreciated as the same become better understood by reference to

DETAILED DESCRIPTION OF THE INVENTION

Figure 1:
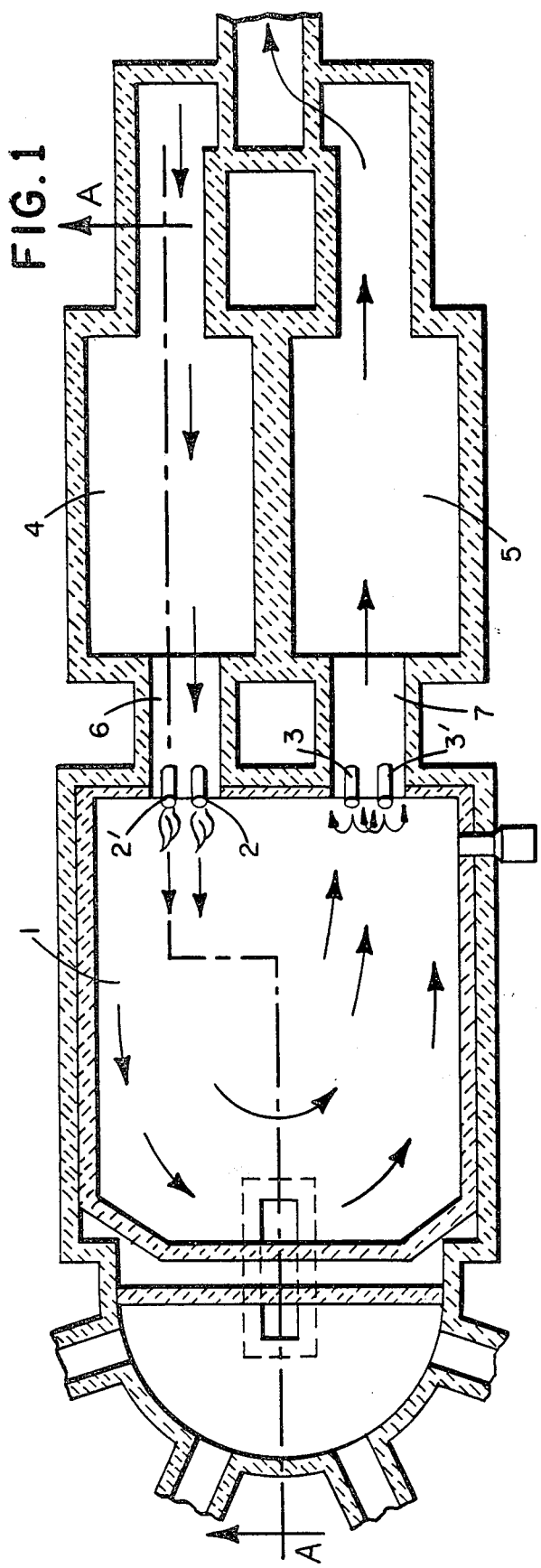
FIG. 1 is a transverse sectional view of a glass-melting furnace of end-firing type according to the present invention.

Referring to the drawings of glass-melting furnaces, the present invention is to be described in detail.

Figure 2:
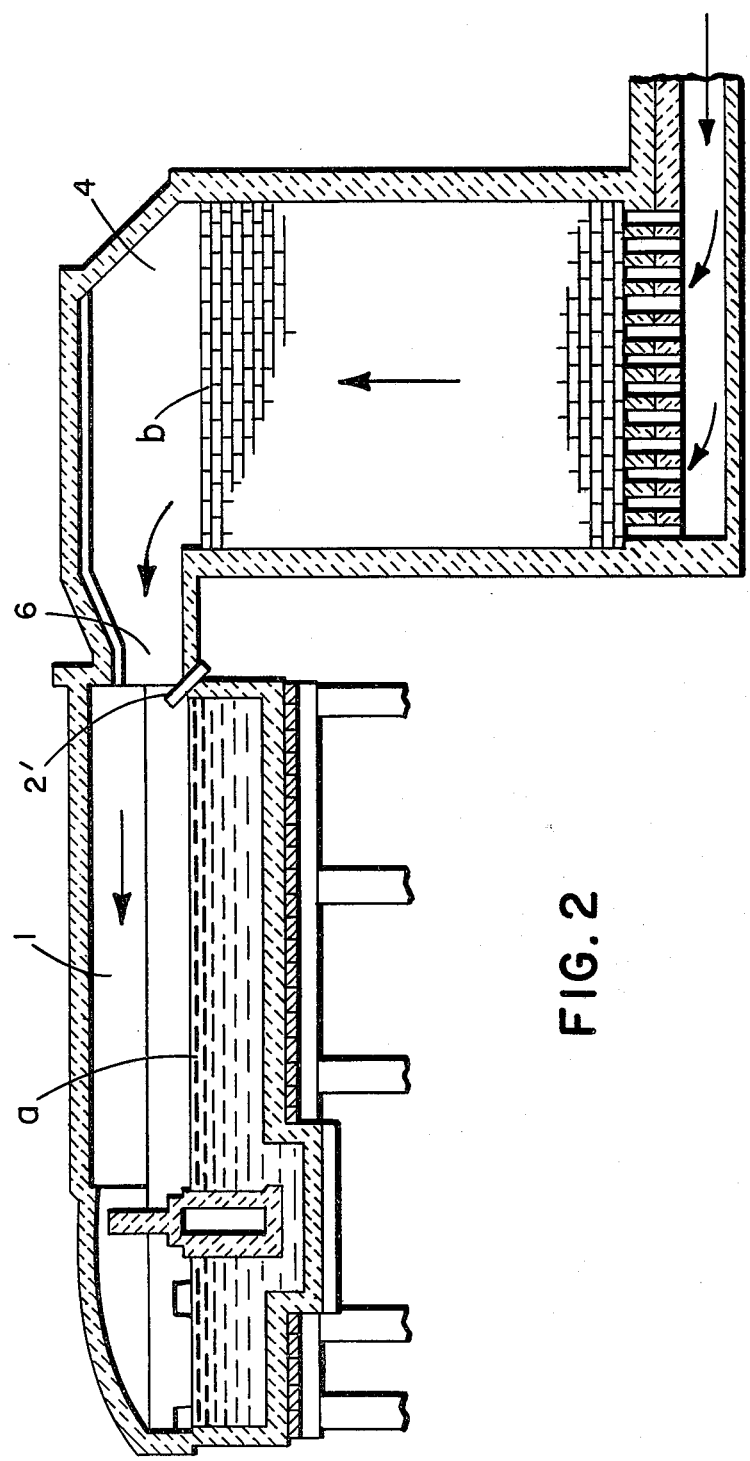
FIG. 2 is a vertical sectional view of the glass-melting furnace of end-firing type in FIG. 1 taken along the line A—A.
Figure 3:
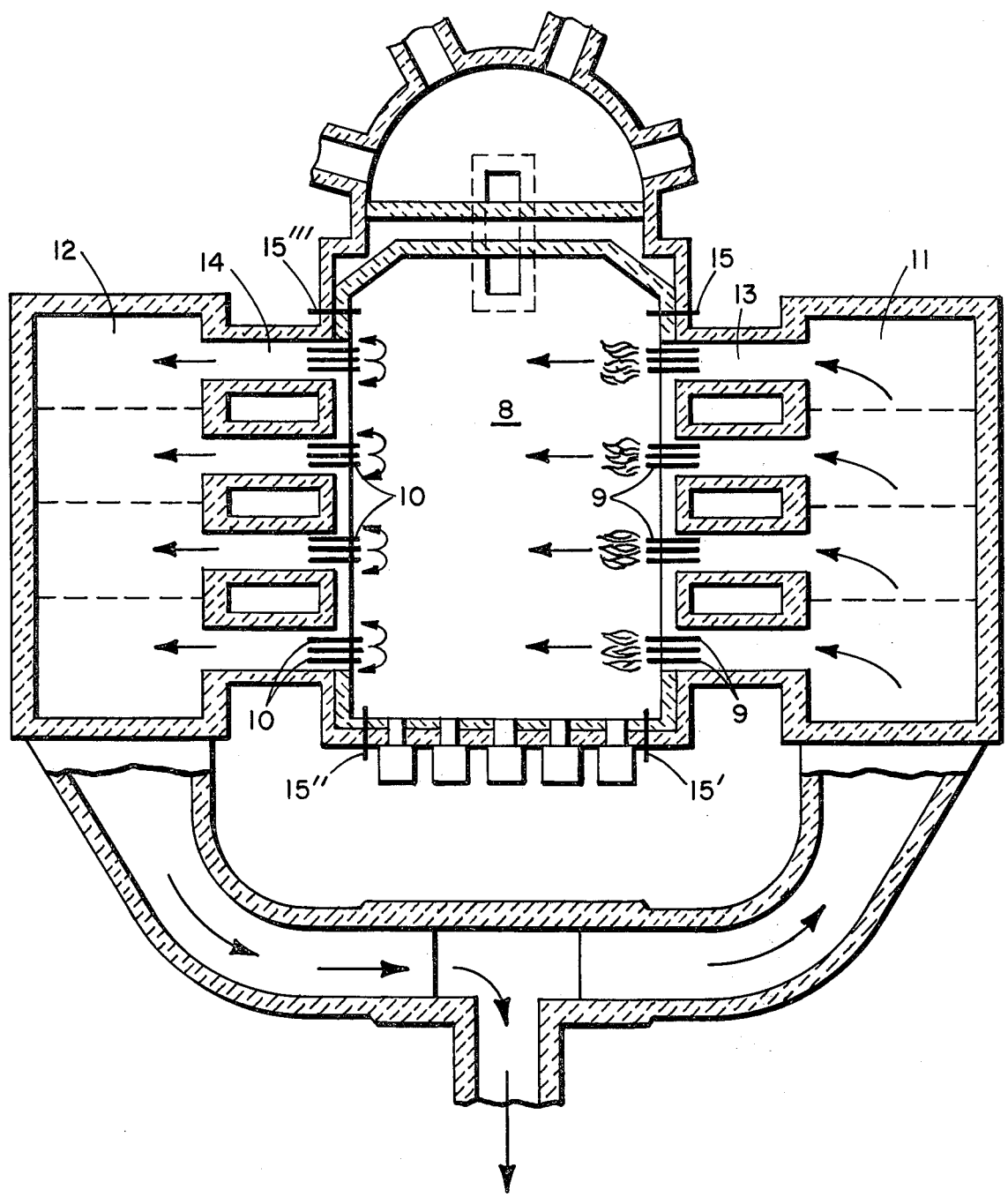
FIG. 3 is a transverse sectional view of a glass-melting furnace of side-firing type according to the present invention.

As illustrated in FIGS. 1, 2 and 3, the glass-melting furnace consists of a melting tank a with a combustion chamber 1 at its top, a throat, a working tank and a fore-hearth (not shown). The combustion system of fuel for heating the melting tank depends on the capacity of the furnace, i.e. the fuel for heating the melting tank is burned, for example, by an end-firing system as illustrated in FIG. 1 in the case of a relatively small furnace and by side-firing system as illustrated in FIG. 3 in the case of a large furnace. Except for special cases, the furnace is invariably equipped with a heat-recovering device to recover the heat in the waste gas to heat the secondary air for fuel combustion. Such a device is usually called a "regenerator", and in this chamber so-called "checker bricks" b are stacked in grid form as masonry having passages therethrough. Illustrating the waste gas flow in the combustion system in FIG. 1, the regenerator is partitioned into two spaces 4 and 5; and the burners 2,2' and 3, 3' are separately located near the ports 6, 7 respectively connecting the spaces 4, 5 to the combustion chamber 1. Now, when the fuel supplied to the burners 2, 2' is burning, the secondary air is discharged through the regenerator 4 and then through the port 6 into the combustion chamber 1 and it serves for the combustion of the fuel supplied to said burners 2, 2'. Hot waste gas generated by combustion of the fuel flows via the port 7 into the regenerator 5, where it heats the checker bricks and then goes out via the flue and the smokestack into the atmosphere. In the meantime, a small volume of air (primary air for atomization in the case of a burner using liquid fuel) is usually continuously supplied to the burners 3, 3' located near the port 7 to protect the burner tips from burning damage. After keeping in this state for a given duration (about 15–30 minutes), the combustion system is switched into the reverse state as follows: Fuel supply to the burners 2, 2' is halted and only a small volume of the primary air is supplied to the burners 2, 2' to avoid the burning damage of the burner tips. Meanwhile the secondary air supply via the regenerator 4 and the port 6 to the combustion chamber 1 is halted; then the burners 3, 3' are supplied with fuel and ignited, and the secondary air comes to be heated while flowing back through the checker bricks of the regenerator 5 which has been heated by hot waste gas in the former combustion state; and, discharged into the combustion chamber 1 via the port 7. The secondary air serves for the combustion of the fuel supplied to the combustion chamber 1 from the burners 3, 3'. Thus the waste gas generated by combustion of the fuel supplied to the burners 3, 3' flows via the port 6 into the regenerator 4, wherein it heats the checker bricks and then goes out into the atmosphere through the flue and the smokestack. After a duration of specified period (about 15–30 minutes) in this state, the combustion system is again switched back to the original state. Hereinafter the burner to which the fuel is supplied and is burning is called a burning burner and the burner to which the fuel is not supplied is called a non-burning burner.

Figure 5:
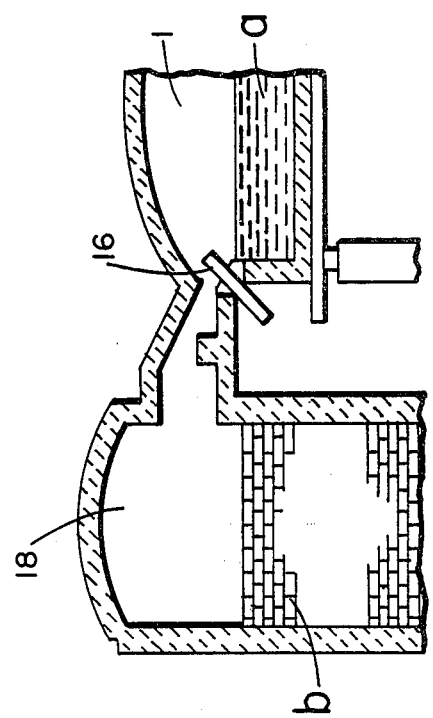
FIGS. 4 and 5 are partial vertical sectional views showing the positional relationship between the port and the burner of the furnace.
Figure 4:
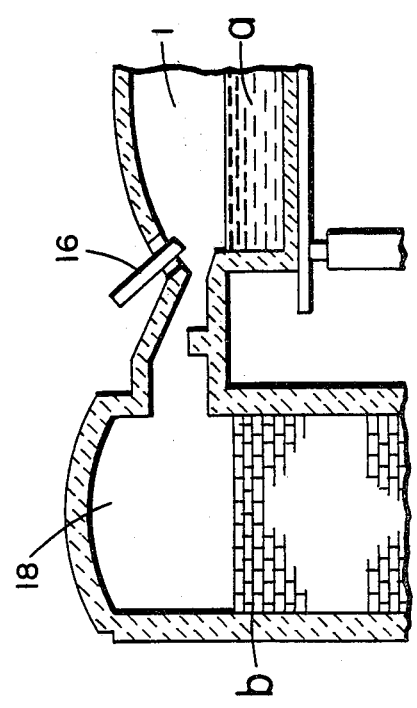

In the case of side-firing furnaces, as illustrated in FIG. 3 the number of ports 13, 14 and burners 9, 10 are increased and in some furnaces the inside space of the regenerators 11, 12 is partitioned into waste gas passages corresponding to the number of the ports (indicated by dotted lines in FIG. 3), while in some others no such partitioning is made. The relative positions of the ports and the burners (in many cases a plurality of burners are installed in parallel) may somewhat differ depending on the respective furnace. The burner 16 may come above the side opening of the port 18, on which the combustion chamber 1 is situated (FIG. 4) or may come below it (FIG. 5); and in some cases, the fuel-ejecting part of the burner may be located in the flow of the secondary air coming from the port.

The main feature of the present invention lies in that in the combustion system of a glass-melting furnace of side firing or end firing type equipped with a heat-recovering device typified by the regenerator, hydrocarbon or the like is ejected from the non-burning burner into the combustion chamber in counter flow to the flow of the waste gas, especially without supplying air for burning.

In the examples the embodiment described below, heavy oil or kerosene as hydrocarbon is supplied through the non-burning burners; the supplied heavy oil or kerosene is gradually burned in the combustion chamber; it goes thereafter, together with the waste gas, into the port; and then it reaches the regenerator. According to these examples various merits of the invention have been confirmed. The supplied heavy oil or kerosene does not generate flame within the regenerator and sufficient reducing effect of $NO_x$ content can be attained without flame hitting the refractory wall of the regenerator. Accordingly the refractory wall of the regenerator is virtually unaffected; installation of any additional equipment for supplying hydrocarbon or the like is not always required; and the greater part of the heat energy contained in the supplied hydrocarbon or the like can be utilized for heating and melting the glass. When the present invention is practically applied, the necessary temperature distribution in the melting tank for securing a good quality of the product is not disturbed and the quality of glass product does not deteriorate.

Usually the same fuel as that supplied to the burning burner may be used for the non-burning burner, but as shown in the following examples, other kinds of fuel (for instance, kerosene, L.P.G. or L.N.G., etc.) may be adopted. For the supply of hydrocarbon or the like, specialized auxiliary burners may be installed in place of the non-burning burners.

On the basis of the finding that flames from the hydrocarbon or the like must not reach the regenerator, it has also been found that the $NO_x$ concentration can be reduced also by introducing the hydrocarbon through all or some of the corners of the combustion chamber without supplying air for combustion. The reason for reduction of $NO_x$ content thereby is not fully accounted for, but it is presumed as follows. Although the combustion flame does not reach the four corners of the combustion chamber, still there are hot portions in said corners and $NO_x$ is generated there also, so that $NO_x$ content is reduced probably through the same effect of supplied hydrocarbon as in the hot waste gas described above.

It is an ordinary practice to supply to the non-burning burner with such a volume of primary air as to prevent burning damage to the burner tips, as described above, when the supplied hydrocarbon or the like is a liquid. This volume of primary air is small enough as compared with the necessary oxygen demand of hydrocarbon so that the primary air may be employed for atomizing liquid hydrocarbon or the like. However, it has been found that use of gaseous hydrocarbon (for example, L.P.G., L.N.G., etc.) for atomizing hydrocarbon or the like instead of the primary air would be more effective.

In the case of a furnace equipped with a kind of heat recovering device other than the regenerator, the direction of fuel ejection, the direction of secondary air ejection and the direction of waste gas outflow in the combustion chamber over the melting tank are always the same; and therefore the same reducing effect of $NO_x$ content can be achieved, by ejecting hydrocarbon or the like in the direction of the combustion chamber at the vicinity of the exit where the waste gas flows out of the combustion chamber.

Description of actual embodiments of the present invention follow.

EXAMPLE 1

In a glass-melting furnace of end firing type for manufacturing flat ware as illustrated in FIG. 1, the following experiment was carried out.

The fuel used in this furnace was heavy oil which was consumed at a rate of about 280 l/hr. Temperature in the furnace as measured by an optical pyrometer was maintained within a range of 1570°–1580° C. and the ware was produced with an output of about 17 t/day. The ignition of the burners was alternated at an interval of 15 minutes. Hydrocarbon, heavy oil or kerosene was introduced into the combustion chamber through one of the non-burning burners 3, 3', while the burning burners 2, 2' are burning, as illustrated in FIG. 1. The fuel supply system for the burners 2, 2' and 3, 3' was equipped with a bypass having a flow meter with a capacity smaller than when used as a burning burner; and thus the volume of hydrocarbon (heavy oil or kerosene) supplied to the burners serving non-burning burners was measured. Meanwhile, $NO_x$ concentration in the waste gas was measured with respect to the waste gas which was taken out of the down stream of a route-change damper for the secondary air. For comparison's sake, in addition to the ordinary primary air for preventing non-burning burner tips from burning damage, L.P.G. was employed at the same pressure of the air as an atomizing gas for the non-burning burner.

The result of the measurements together with the main conditions of furnace operation are summarized in Table 1. The result clearly shows that the $NO_x$ concentration in the waste gas decreases by supply of hydrocarbon or the like.

When the rate of decrease of $NO_x$ concentration is expressed by following equation:

Rate of decrease of $NO_x$ concentration (%) =

$$\frac{NO_x \text{ concentration before hydrocarbon supply} - NO_x \text{ concentration after hydrocarbon supply}}{NO_x \text{ concentration before hydrocarbon supply}} \times 100$$

the rate of decrease of $NO_x$ concentration steadily grows with the increasing supply volume of hydrocarbon; and it is recognized that decrease of the $NO_x$ concentration by about 60% of the original value occurs after the introduction of hydrocarbon in a volume corresponding to about 5% of the fuel consumed at the burning burner. In this experiment practically no flame due to the supplied hydrocarbon was observed even at the maximum supply volume.

It was also found that under the use of L.P.G. for atomization the rate of decrease of $NO_x$ was higher than under the use of air for the same purpose.

EXAMPLE 2

In a glass-melting furnace of side firing type with a structure as illustrated in FIG. 3 and a capacity of about 300 t for manufacturing bottles, the following experiment was carried out. There are provided ports 13, 14 at 4×2 spots in the furnace, each port being provided with three burners 9, 10 and cocks were installed so as to control and measure the flow rate of hydrocarbon and the pressure of air for atomization in each burner for every port unit when the burners are serving as the non-burning burners.

The conditions of furnace operation and the result of measurement in this experiment are summarized in Table 2, according to which the $NO_x$ concentration in the waste gas can be reduced through the introduction of kerosene as hydrocarbon; to be more specific, the decrease of $NO_x$ concentration in the waste gas reaches 22.0% of the original value as the result of supplying the hydrocarbon in a volume corresponding to about 6% of the fuel (heavy oil) consumed by the burning burner. At this supplying rate of hydrocarbon (kerosene), neither flame in the regenerator nor adverse effect on the quality of the melted glass was observed.

EXAMPLE 3

In the furnace of Example 2, auxiliary burners 15, 15', 15'', 15''' were installed at the corners of the combustion chamber (see FIG. 3). The flow rate of hydrocarbon and the volume of air for atomization in all the burners were respectively adjusted to the same values and the total flow volume of kerosene was measured by a flow meter. The decrease rate of $NO_x$ concentration was calculated by carrying out a measurement for $NO_x$ concentration in the gaseous components of the waste gas collected at the exit of the regenerator on the non-burning side.

The waste gas mentioned above was the one which was produced out of the alternating combustion of kerosene by burners 9 and 10 at a 15 minute interval whose kerosene was supplied to the inside-furnace through auxiliary burners. The result of this experiment together with the main conditions of furnace operation are summarized in Tables 3 and 4, wherein "right" or "left" respectively indicates that "the left burners" or "the right burners" in FIG. 3 as viewed facing the drawing are working as burning burners. According to the result, $NO_x$ concentration decreases by supplying hydrocarbon (kerosene); i.e. $NO_x$ concentration was reduced by about 29.5% on the average when kerosene was introduced in a volume corresponding to 3% of the consumption volume of the fuel (heavy oil) at the burning burner.

any of the auxiliary burners. However, the result is much better when the four auxiliary burners were used simultaneously or when two auxiliary burners on the throat side were used.

TABLE 1

| Furnace Temperature and Output | Fuel Consumption at Burning Burners | Consumption of Hydrocarbon | Atomizing Pressure for Hydrocarbon | Ceiling Temperature in the Regenerator | $O_2$ Concentration | $NO_x$ Concentration | Decreasing rate of $NO_x$ |
|---|---|---|---|---|---|---|---|
| | | Kerosene 0 l/hr. | Air — | 1233° C. | 9.7% | 230 ppm | — |
| | | 5 | 0.15kg/cm² | " | 9.4 | 195 | 15.2% |
| | | 10 | " | 1235 | 9.3 | 155 | 32.6 |
| | | 15 | " | " | 9.2 | 95 | 58.7 |
| 1575° C. | Heavy Oil 280 l/hr. | | L.P.G. | | | 125 | 45.6 |
| 17 t/day | | 10 | 0.15 | " | " | | |
| | | 15 | " | " | 9.1 | 80 | 65.2 |
| | | Heavy Oil 0 | Air — | 1233 | 9.5 | 240 | — |
| | | 5 | 0.15 | 1235 | 9.1 | 200 | 16.6 |
| | | 10 | " | " | 8.9 | 150 | 37.5 |
| | | 15 | " | " | 8.8 | 90 | 62.5 |

TABLE 2

| Furnace Temperature and Output | Fuel Consumption at Burning Burners | Consumption of Hydrocarbon | Atomizing Pressure for Hydrocarbon | Ceiling Temperature in the Regenerator | $O_2$ Concentration | $NO_x$ Concentration | Decreasing rate of $NO_x$ |
|---|---|---|---|---|---|---|---|
| | | Kerosene 0 l/hr. | Air —kg/cm² | 1164° C. | 9.8% | 680 ppm | —% |
| 1535° C. 18 t/day | Heavy Oil 1480 l/hr. | 44.2 | 0.5 | " | 9.3 | 600 | 11.7 |
| | | 88.8 | " | 1170 | 8.9 | 530 | 22.0 |

TABLE 3

| Furnace Temperature and Output | Fuel Consumption at Burning Burners | Consumption of Hydrocarbon | Atomizing Pressure for Hydrocarbon | Ceiling Temperature in the Regenerator | $O_2$ Concentration | $NO_x$ Concentration | Decreasing rate of $NO_x$ |
|---|---|---|---|---|---|---|---|
| | | Kerosene 0 l/hr. | Air —kg/cm² | Right 1160° C. Left 1180 | 9.2% 9.1 | 480 ppm 471 | —% — |
| 1510° C. 190 t/day | Heavy Oil 1560 l/hr | 31.2 | 0.4 | Right 1162 Left 1183 | 8.9 8.6 | 382 368 | 20.4 21.8 |
| | | 46.8 | " | Right 1162 Left 1185 | 8.7 8.4 | 358 332 | 25.4 29.5 |

TABLE 4

| Furnace Temperature and Output | Fuel Consumption at Burning Burners | Consumption of Hydrocarbon | Number & Location of Auxiliary Burners | Atomizing Pressure for Hydrocarbon | $O_2$ Concentration | $NO_x$ Concentration | Decreasing rate of $NO_x$ |
|---|---|---|---|---|---|---|---|
| | | Kerosene 0 l/hr | — | Air —kg/cm² | Right 9.8% Left 9.7 | 750 ppm 610 | —% — |
| | | 29.6 | 4, in the 4 corners | Each being 0.45 | Right 9.5 Left 9.2 | 615 470 | 18.0 22.9 |
| 1535° C. 180 t/day | Heavy Oil 1480 l/hr. | " | 2, in right side corners | 0.45 | Right 9.7 Left 9.4 | 645 495 | 14.0 18.8 |
| | | " | 2, in left side corners | " | Right 9.5 Left 9.3 | 615 515 | 18.0 15.5 |
| | | " | 2, corners on the side of fuel supply | " | Right 9.7 Left 9.4 | 630 520 | 16.0 14.7 |
| | | " | 2, in 2 position on throat side | " | Right 9.7 Left 9.4 | 625 445 | 16.6 27.0 |

In Table 4 are given the result of measurement with the total supply volume of kerosene unchanged, when kerosene was supplied in equal quantities to the four auxiliary burners and when kerosene was supplied in equal quantities to respective two auxiliary burners located at different sides (in the latter case, air pressure for atomization was kept constant). The result shows that $NO_x$ concentration invariably decreases by using

What is claimed is:

1. A method for reducing $NO_x$ content in a waste gas generated in a glass melting furnace of side firing or end firing type which is equipped with a regenerator, comprising supplying hydrocarbons into the waste gas from fuel combustion produced over a melting tank within a combustion chamber, without supplying sufficient additional oxygen for burning said hydrocarbons, so as to effect the reducing reaction of the $NO_x$ in the combustion waste gas.

2. Method of claim 1, wherein said hydrocarbons are heavy oil or kerosene.

3. Method of claim 1 or 2, wherein said hydrocarbons are supplied by atomizing with compressed air.

4. Method of claim 1 or 2, wherein said hydrocarbons are supplied by atomizing with L.P.G.

5. Method of claim 1, wherein said hydrocarbons are supplied by atomizing from the vicinity of a port connecting a regenerator with the combustion chamber over the melting tank.

6. A method for reducing $NO_x$ content in waste gas generated in a glass-melting furnace of side firing or end firing type, which is equipped with a heat recovering device, comprising supplying hydrocarbons into waste gas from fuel combustion above the glass melt, without supplying sufficient additional oxygen for burning said hydrocarbons, through auxiliary burners installed at the corners of the furnace.

7. Method of claim 6, wherein said hyddrocarbons are kerosene.

8. Method of claim 3, wherein said hydrocarbons are supplied by atomizing from the vicinity of a port connecting a regenerator with the combustion chamber over the melting tank.

9. A glass-melting furnace of side firing or end firing type equipped with a regenerator, comprising a combustion chamber provided above a glass-melting tank in which an unmelted batch material is fed and melted material is stored, at least two sets of burners for alternatively feeding a fuel and oxygen supply which is to be burned into the combustion chamber, means for feeding hydrocarbons into the waste gas produced by combustion of the fuel simultaneously with the feeding of fuel and oxygen supply by a first set of burners, and control means for restricting the oxygen supply to the hydrocarbon feeding means while combustion is occurring at said first set of burners, whereby the $NO_x$ in the waste gas from the glass-melting furnace can be reduced.

10. The glass-melting furnace of claim 9, wherein said hydrocarbon feeding means is at least one of said sets of burners for alternatively feeding a fuel and oxygen supply which is to be burned which halts feeding said fuel and oxygen supply into the combustion chamber to feed hydrocarbons into the waste gas.

11. The glass-melting furnace of claim 9, wherein said hydrocarbon feeding means is at least one auxiliary burner.

12. The glass-melting furnace of claim 11, wherein said auxiliary burners are provided at the corners of the combustion chamber over the melting tank.

* * * * *